US012282639B2

(12) United States Patent
Kakinoki

(10) Patent No.: US 12,282,639 B2
(45) Date of Patent: Apr. 22, 2025

(54) SENSOR MODULE AND DISPLAY DEVICE INCLUDING THE SENSOR MODULE

(71) Applicant: Japan Display Inc., Tokyo (JP)

(72) Inventor: Yuto Kakinoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/504,855

(22) Filed: Nov. 8, 2023

(65) Prior Publication Data
US 2024/0192816 A1 Jun. 13, 2024

(30) Foreign Application Priority Data

Dec. 8, 2022 (JP) .................. 2022-196274

(51) Int. Cl.
*G06F 3/044* (2006.01)
*G02F 1/1333* (2006.01)

(52) U.S. Cl.
CPC ........ *G06F 3/0446* (2019.05); *G02F 1/13338* (2013.01)

(58) Field of Classification Search
CPC ......... G06F 3/0446; G06F 2203/04103; G06F 3/041; G06F 3/0412; G06F 3/04164; G06F 3/0443; G06F 3/0445; G02F 1/13338; G02F 1/1333
See application file for complete search history.

(56) References Cited

U.S. PATENT DOCUMENTS

| 2005/0073507 A1* | 4/2005 | Richter ................. G06F 3/0443 345/174 |
| 2007/0216841 A1* | 9/2007 | Konno .............. G02F 1/134363 349/141 |
| 2014/0002177 A1 | 1/2014 | Noguchi et al. |
| 2014/0125628 A1* | 5/2014 | Yoshida ................ G06F 3/0445 345/174 |
| 2022/0404944 A1* | 12/2022 | Lee .......................... G06F 3/044 |

FOREIGN PATENT DOCUMENTS

JP            2014010603 A         1/2014

* cited by examiner

*Primary Examiner* — Towfiq Elahi
(74) *Attorney, Agent, or Firm* — K&L Gates LLP

(57) ABSTRACT

Disclosed is a sensor module including a first substrate having an insulating property, a plurality of sensor electrodes over the first substrate, a second substrate having an insulating property over the plurality of sensor electrodes, at least one charge-dispersing film over the second substrate, and a third substrate over the at least one charge-dispersing film. The at least one charge-dispersing film may consist of one charge-dispersing film overlapping all of the plurality of sensor electrodes.

14 Claims, 18 Drawing Sheets

240

US 12,282,639 B2

SENSOR MODULE AND DISPLAY DEVICE INCLUDING THE SENSOR MODULE

This application claims the benefit of priority to Japanese Patent Application No. 2022-196274, filed on Dec. 8, 2022, the entire contents of which are incorporated herein by reference.

FIELD

An embodiment of the present invention relates to a sensor module and a display device including the sensor module. For example, an embodiment of the present invention relates to a non-contact-type sensor module and a display device including the non-contact-type sensor module.

BACKGROUND

Capacitive sensor modules have been widely used as one of the interfaces for inputting information into information terminals. In a sensor module, when an input means approaches a plurality of sensor electrodes arranged in a matrix form, a virtual capacitive element is formed between the sensor electrodes and the input means, resulting in a fluctuation of the potentials of the sensor electrodes. The use of the potential fluctuation of the plurality of sensor electrodes makes it possible to identify the input position of the input means (see, Japanese Patent Application Publication No. 2014-10603, for example).

SUMMARY

An embodiment of the present invention is a sensor module. The sensor module includes a first substrate having an insulating property, a plurality of sensor electrodes over the first substrate, a second substrate having an insulating property over the plurality of sensor electrodes, at least one charge-dispersing film over the second substrate, and a third substrate over the at least one charge-dispersing film.

An embodiment of the present invention is a display device. The display device includes a display module and a sensor module over the display module. The sensor module includes a first substrate having an insulating property, a plurality of sensor electrodes over the first substrate, a second substrate having an insulating property over the plurality of sensor electrodes, at least one charge-dispersing film over the second substrate, and a third substrate over the at least one charge-dispersing film.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and each drawing, the same reference number is provided to an element that is the same as that which appears in preceding drawings, and a detailed explanation may be omitted as appropriate. When a plurality of the same or similar structures is collectively represented, a reference number is used, while a hyphen and a natural number follow the reference number when the structures are independently represented.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a portion of the structure is not covered by the other structure and includes a mode where the portion uncovered by the other structure is further covered by another structure. In addition, the mode expressed by this expression includes a mode where the structure is not in contact with the other structure.

In the embodiments of the present invention, when a plurality of films is formed with the same process at the same time, these films have the same layer structure, the same material, and the same composition. Hence, the plurality of films is defined as existing in the same layer.

First Embodiment

In this embodiment, a sensor module 200 and a display device 100 including the sensor module 200 according to an embodiment of the present invention are explained.

1. Display Device

Figure 1:
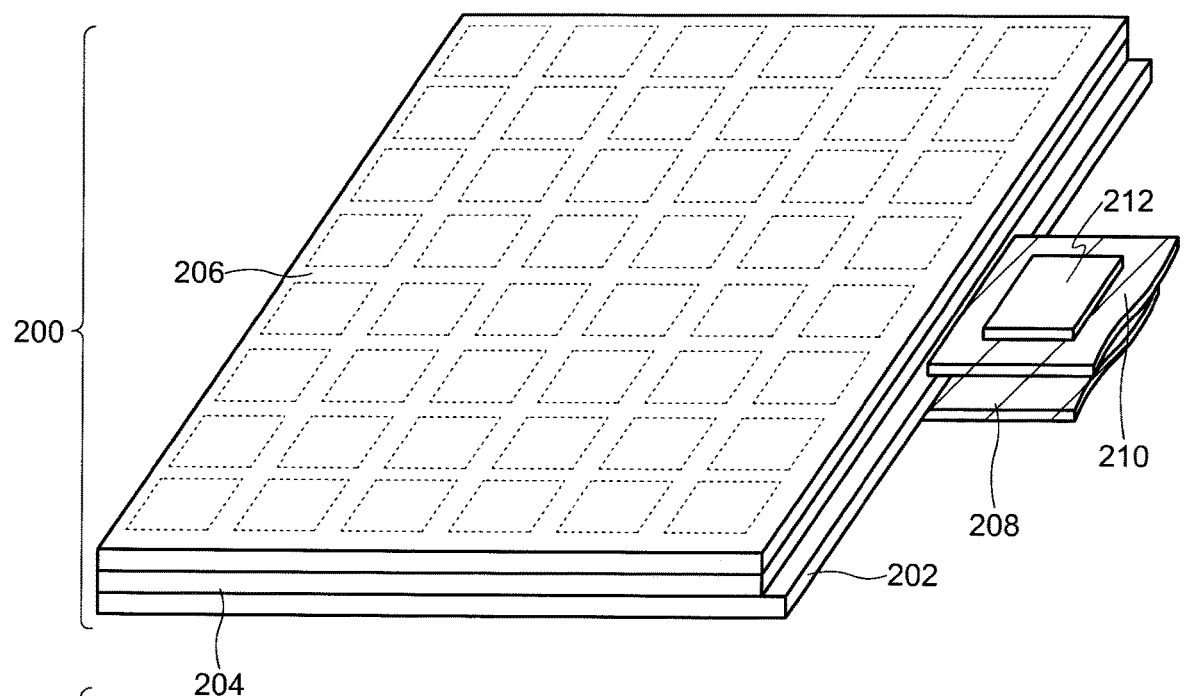
FIG. 1 is a schematic developed perspective view of a display device according to an embodiment of the present invention.
Figure 1:
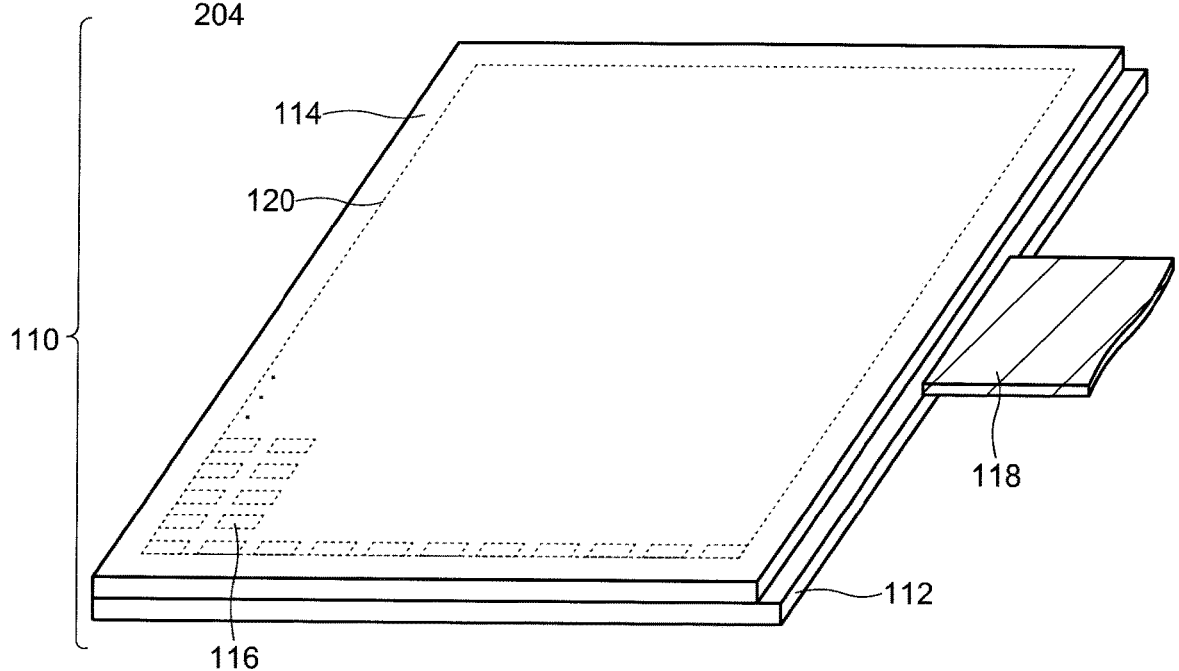

A schematic developed perspective view of the display device 100 is shown in FIG. 1. The display device 100 includes a display module 110 and a sensor module 200 disposed over the display module 110. The display module 110 and the sensor module 200 may be fixed to each other with an adhesive layer which is not illustrated in FIG. 1.

2. Display Module

The display module 110 has a function of displaying images and includes an array substrate 112, a plurality of pixels 116 formed over the array substrate 112, and a counter substrate 114 over the array substrate 112 as the fundamental components thereof. The plurality of pixels 116 is arranged in a matrix form having a plurality of rows and columns. Hereinafter, the row direction and the column direction are also referred to as a x-direction and a y-direction, respectively. The region where the plurality of pixels 116 is provided is called a display region 120. Each pixel 116 has a display element and functions as the minimum unit providing color information. In addition to a liquid crystal element, an electroluminescent element (self-luminous light-emitting element) exemplified by an inorganic electroluminescent element (LED), an organic electroluminescent element (OLED), and the like may be used as the display element. When a liquid crystal element is used, the display module 110 is further provided with a light source (backlight) which is not illustrated. Each pixel 116 operates according to a power source and video signals supplied via a connector 118 such as a flexible printed circuit (FPC) board to provide light of a specific color in a gradation according to the video signals. Images can be displayed on the display region 120 by controlling the operation of the pixels 116 according to the video signals.

There are no restrictions on the size of the display module 110, and the display module 110 may have a size used for portable communication terminals, called 12.1 inch (31 cm) size, a size suitable for a monitor connected to a computer, television, signage, and the like (for example, 14.1 inch (36 cm) size to 32 inch (81 cm) size), or an even larger size, for example.

3. Sensor Module

The sensor module 200 is a device transmitting the light from the display module 110 and functioning as an interface for inputting information to the display device 100. The sensor module 200 is a contact-type or non-contact-type sensor module and has a function of detecting an input means such as a finger, a palm, and a stylus with a plastic tip and specifying its position over the sensor module 200 (hereinafter, simply referred to as an input position) not only when the input means contacts the sensor module 200 directly, but also when the input means approaches within the detection range without contacting the sensor module 200. The position of the input means may be a position in two-dimensional coordinates in the detection range (sensor region described below), i.e., positions of the coordinates in the x-direction and the y-direction in the detection range, or may be a position in three-dimensional coordinates, i.e., a position of the coordinate in the z-direction as well as in the x- and y-directions in the detection range. The detection range in the z-direction may be appropriately set, for example, within 5 mm, 20 mm, 50 mm, or 100 mm from the outermost surface of the sensor module 200. Hereinafter, each component of the sensor module 200 is explained.

3-1. Sensor Substrate and Cover Substrate

Figure 2:
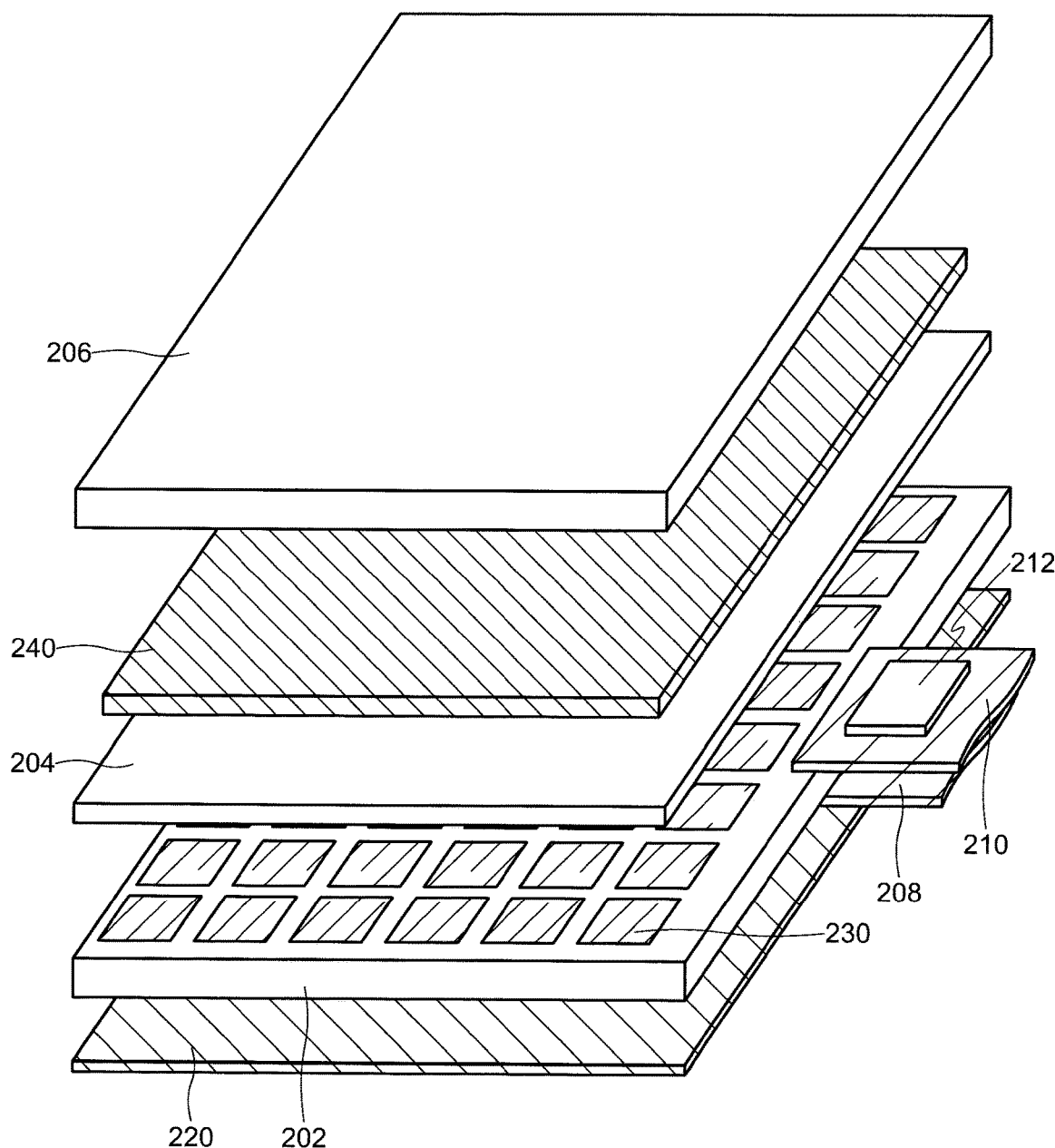
FIG. 2 is a schematic developed perspective view of a sensor module according to an embodiment of the present invention.

As shown in FIG. 1 and the schematic developed perspective view in FIG. 2, the sensor module 200 has a sensor substrate 202 and a cover substrate 206 opposing the sensor substrate 202. The sensor substrate 202 and the cover substrate 206 are each an insulating substrate and are composed of a material transmitting visible light so that the images displayed by the display module 110 can be viewed. Hence, the sensor substrate 202 and cover substrate 206 are composed of glass, quartz, a polymeric material such as a polyimide, a polyamide, and a polycarbonate, or the like. The sensor substrate 202 and/or the cover substrate 206 may be flexible in order to be arbitrarily deformed or may have low flexibility so as not to be plastically deformed.

3-2. Sensor Electrode

A plurality of sensor electrodes 230 is provided between the sensor substrate 202 and the cover substrate 206. The plurality of sensor electrodes 230 is arranged in a matrix form having a plurality of rows and a plurality of columns. The area where the plurality of sensor electrodes 230 is arranged is called a sensor region, and the sensor electrodes 230 are arranged so that the sensor region overlaps the display region 120. The number (i.e., the numbers of rows and columns) and the size (area) of the sensor electrodes 230 may be set appropriately according to the size of the display device 100 and the detection accuracy required for the sensor module 200. As can be understood from FIG. 1, each sensor electrode 230 has an area larger than the pixel 116 and is disposed to overlap the plurality of pixels 116.

The sensor electrodes 230 include a light-transmitting oxide such as indium-tin mixed oxide (ITO) and indium-zinc mixed oxide (IZO). Alternatively, the sensor electrodes 230 may include a metal (0-valent metal) such as titanium, molybdenum, tungsten, aluminum, and copper or an alloy containing one or more of these metals. When such a metal is used, the sensor electrodes 230 may be formed as a mesh having a plurality of openings or a thin wire to ensure the light-transmitting property.

3-3. Charge-Dispersing Film and Capacitance-Forming Layer

Figure 3:
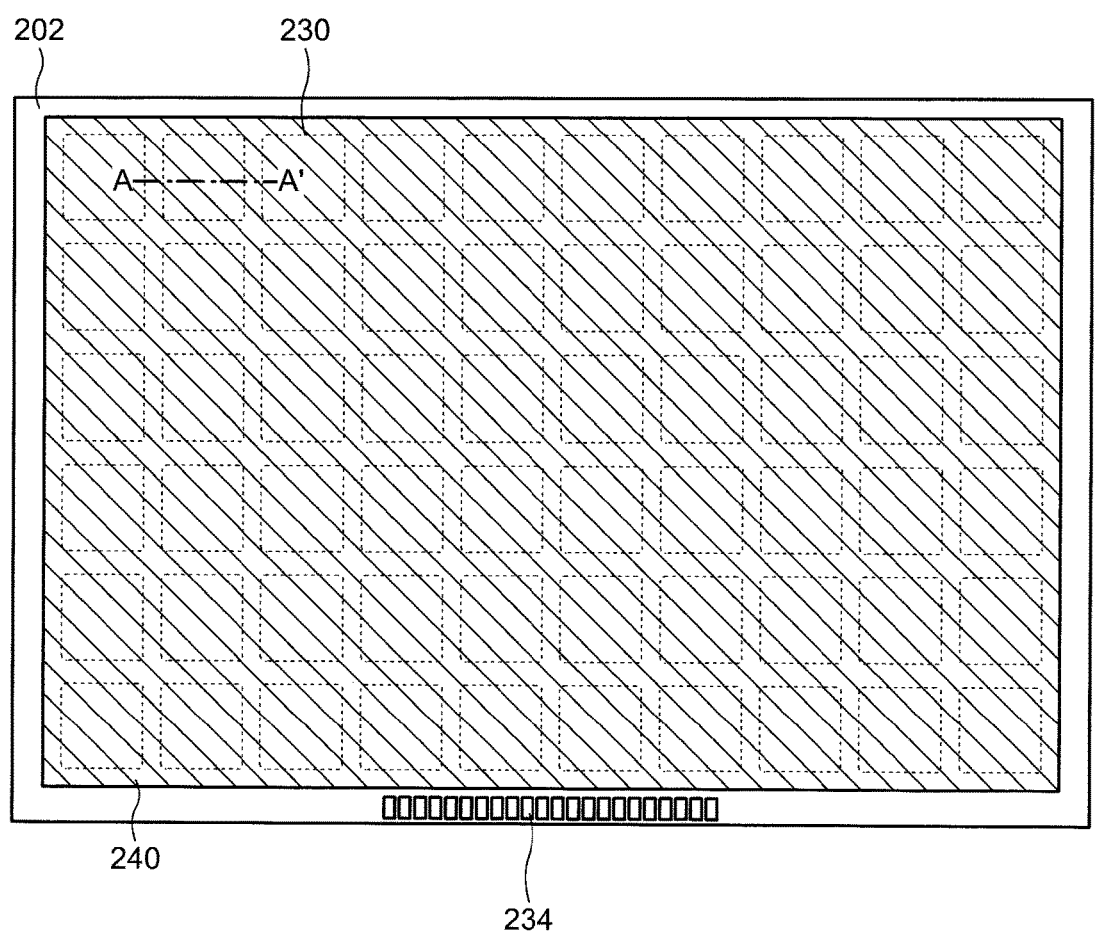
FIG. 3 is a schematic top view of a sensor module according to an embodiment of the present invention.

As shown in FIG. 2 and FIG. 3, the sensor module 200 further includes a capacitance-forming layer 204 disposed over the plurality of sensor electrodes 230 and a charge-dispersing film 240 over the capacitance-forming layer 204 over which the cover substrate 206 is arranged. Thus, the capacitance-forming layer 204 is sandwiched by the sensor electrodes 230 and the charge-dispersing film 240.

The capacitance-forming layer 204 is formed with an insulating layer and is composed of, for example, glass, quartz, a polymeric material such as a polyimide, a polyamide, and a polycarbonate, or the like. Since the images generated by the display module 110 are viewed through the sensor module 200, the capacitance-forming layer 204 is also configured to transmit visible light similar to the sensor substrate 202 and the cover substrate 206. The capacitance-forming layer 204 may also be flexible.

As shown in a schematic view of the cross section along the chain line A-A' in FIG. 3 (FIG. 4A), the capacitance-forming layer 204 is fixed over the plurality of sensor electrodes 230 with a light-transmitting adhesive layer 236. As described below, when the input position is identified, a capacitance is formed by the capacitance-forming layer 204 as well as the sensor electrodes 230 and the charge-dispersing film 230 sandwiching the capacitance-forming layer 204, thereby dispersing the charge of the sensor electrodes 230. A thickness of the capacitance-forming layer 204 is adjusted, for example, to be equal to or greater than 1 μm and equal to or less than 1.0 mm in order to form an appropriate capacitance. When the capacitance-forming layer 204 has a thickness of several μm to several tens of μm, an inorganic film, an organic film, or a stack thereof is employed. When the capacitance-forming layer 204 has a thickness of several hundred micrometers to several millimeters, a glass substrate is employed as the capacitance-forming layer 204, for example. In this case, a configuration in which the charge-dispersing film 240 is formed over the glass substrate may also be employed.

Figure 4A:
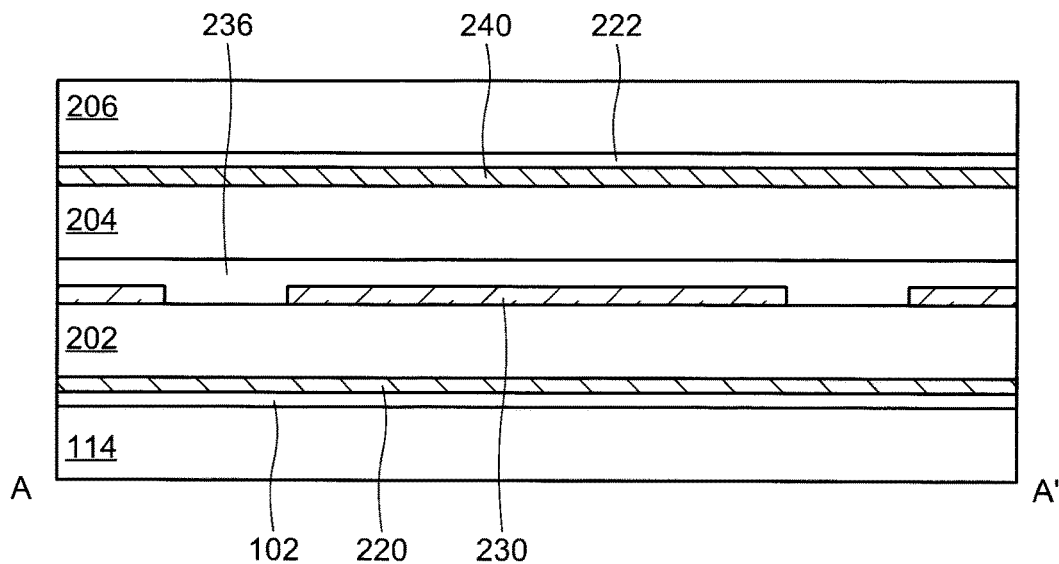
FIG. 4A is a schematic cross-sectional view of a sensor module according to an embodiment of the present invention.

As can be understood from FIG. 3 and FIG. 4A, the charge-dispersing film 240 is disposed over the plurality of sensor electrodes 230 via the capacitance-forming layer 204 so as to overlap the plurality of sensor electrodes 230. The charge-dispersing film 240 may be arranged to overlap all of the sensor electrodes 230. However, when the sensor electrodes 230 located in the uppermost row, the lowermost row, and/or both of the end columns do not contribute to the detection of the input means, the sensor electrodes 230 located in these rows or columns may be partially or entirely exposed from the charge-dispersing film 240. The charge-dispersing film 240 may be formed directly over the capacitance-forming layer 204 using a deposition method such as a sputtering method, a chemical vapor deposition (CVD) method, or the like or may be fixed to the capacitance-forming layer 204 using an adhesive layer which is not illustrated. In this case, the cover substrate 206 is fixed to the charge-dispersing film 240 via an adhesive layer 222 (FIG. 4A). Alternatively, the charge-dispersing film 240 may be formed so as to be in direct contact with the cover substrate 206 using a sputtering method, a CVD method, or the like. In this case, the capacitance-forming layer 204 and the charge-dispersing film 240 are fixed to each other with an adhesive layer which is not illustrated.

Figure 4B:
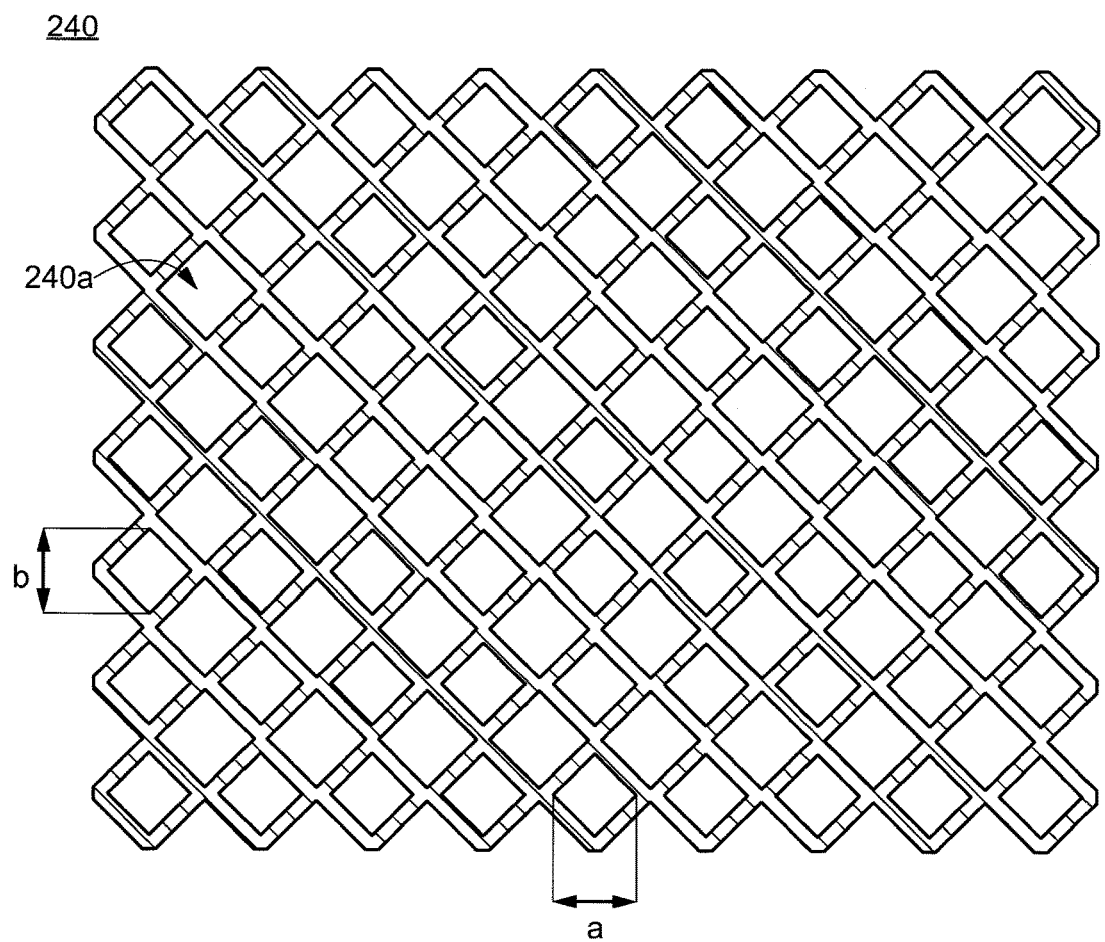
FIG. 4B is a schematic enlarged top view of a sensor module according to an embodiment of the present invention.

The charge-dispersing film 240 may be configured as a single electrode overlapping all or a plurality of the sensor electrodes 230. In this case, the charge-dispersing film 240 is configured as a conductive film with a relatively high electrical resistance, and its electrical resistance is set to be equal to or greater than $1\times10^5$ Ω/☐ and less than $1\times10^7$ Ω/☐. The charge-dispersing film 240 is also configured to transmit visible light so that the images generated by the display module 110 can be viewed. Therefore, the charge-dispersing film 240 includes a light-transmitting oxide such as ITO and IZO and is provided to have a relatively small thickness (e.g., equal to or greater than 30 nm and equal to or less than 100 nm) to realize the aforementioned electrical resistance, for example. Alternatively, the charge-dispersing film 240 may include the aforementioned metal or alloy which can be used for the sensor electrodes 230. In this case, the charge-dispersing film 240 is formed as a mesh form having a plurality of openings 240a to ensure the light-transmitting property as shown in FIG. 4B. The shape of the openings 240a may be arbitrarily determined and may be a circle, an oval, a square, a rectangle, a diamond, a parallelogram, a triangle, or a polygon of pentagons or larger, for example. The size (area) of the openings 240a may also be selected as appropriate, and the maximum length a in the row direction and the maximum length b in the column direction are determined in terms of invisibility, for example, and depend on the relationship between the display module 110 and the user's eye position. For example, when the display module 110 is a small display module such as a smart phone, the maximum length a and the maximum length b are each set at several hundred nm, while, when the display module is a large display device such as a large television, the maximum length a and the maximum length b are set at several tens of mm. The maximum length a and the maximum length b may be the same as or different from each other.

3-4. Other Components

A wiring (not illustrated) electrically connected to the sensor electrode 230 extends from each sensor electrode 230 to a side of the sensor substrate 202 to form a terminal 234 at the end portion (FIG. 3). A first connector 210 such as a flexible printed circuit (FPC) board is electrically connected to the terminal 234 (FIG. 1 and FIG. 2), and a detection circuit 212 is provided over the first connector 210. Power supplied from an external circuit which is not illustrated is converted into an alternating voltage (alternating square wave) by the detection circuit 212, and this alternating voltage is supplied to each sensor electrode 230 via the terminal 234.

A noise-shield layer 220 may be provided between the sensor substrate 202 of the sensor module 200 and the counter substrate 114 of the display module 110 to shield the electrical influences from the display module 110. The noise-shield layer 220 may be fixed over the counter substrate 114 via an adhesive layer 102 (FIG. 4A). Alternatively, the noise-shield layer 220 may be formed over the counter substrate 114 and then fixed to the sensor substrate 202 using the adhesive layer 102 although not illustrated. The noise-shield layer 220 includes a light-transmitting oxide such as ITO and IZO or a metal. In the latter case, a mesh-shaped metal film with a plurality of openings may be used as the noise-shield layer 220 to allow visible light to pass therethrough. The noise-shield layer 220 is provided so as to overlap the plurality of sensor electrodes 230. A second connector 208 such as an FPC board is electrically connected to the noise-shield layer 220 (see FIG. 1 and FIG. 2), and a pulsed alternating voltage with the same phase as the potential applied to the sensor electrodes 230 is applied thereto. Therefore, the noise-shield layer 220 is always equipotential with the sensor electrodes 230. It is also possible to adopt a configuration in which a conductive adhesive layer used for fixing the display module 110 to the counter substrate 114 or fixing a polarizing plate or the cover substrate 206 to the counter substrate 114 is used as the noise-shield layer 220.

3-5. Identification of Input Position by Sensor Module

As described above, an alternating voltage (alternating square wave) is generated by the detection circuit 212 provided over the first connector 210, and this alternating voltage is supplied to each sensor electrode 230 via the terminal 234. When the input means approaches the sensor module 200, a virtual capacitor is formed between the input means and the sensor electrodes 230, which causes a change in the capacitance of the sensor electrodes 230. The detection circuit 212 detects this capacitance change as a potential fluctuation and further digitizes the potential fluctuation to convert it to a detection signal so that a sensor value corresponding to each sensor electrode 230 is obtained. The coordinates representing the input position are determined using the sensor value of each sensor electrode 230.

Figure 5A:
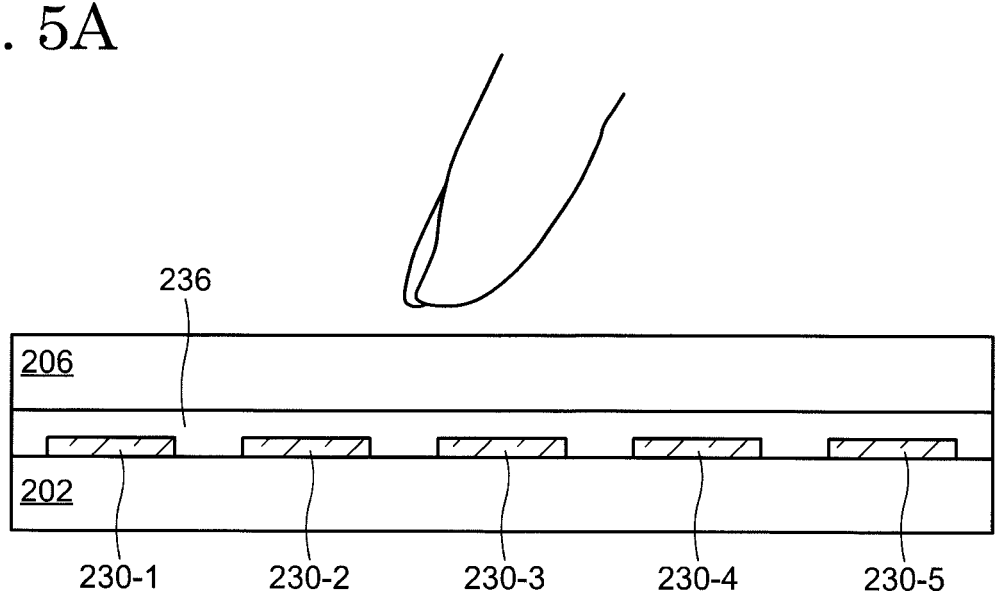
FIG. 5A is a schematic cross-sectional view for explaining an operation of a conventional sensor module.
Figure 5B:
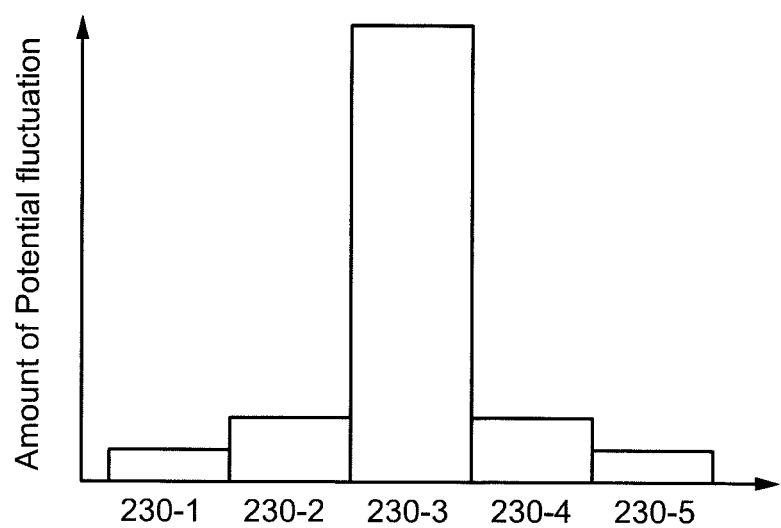
FIG. 5B is a schematic view for explaining an operation of a sensor module.

At that time, the sensor value of the sensor electrode closest to the input means (in this case, sensor electrode 230-3) is the largest in a conventional sensor module without a charge-dispersing film as shown in the schematic cross-sectional view in FIG. 5A. If only the sensor value of the sensor electrode 230 showing the largest sensor value, i.e., the sensor electrode 230-3 closest to the input means, is used to identify the input position, it is impossible to precisely identify the input position so as to conform to the fine image provided by the display module 110 because the sensor electrode 230 is larger than the pixel 116 as described above. Hence, not only the sensor value of the sensor electrode 230 showing the largest sensor value, but also the sensor values of the neighboring sensor electrodes 230 thereto (e.g., sensor electrodes 230-1, 230-2, 230-4, 230-5 in the example in FIG. 5A) are used. However, as schematically represented in FIG. 5B, the sensor values of the sensor electrodes 230 other than the sensor electrode 230-3, which is the closest to the approach of the input means, are extremely small compared with the sensor value of the sensor electrode 230-3. This extremely small distribution of the sensor values makes it difficult to accurately determine the positional relationship between the input means and the sensor electrode 230-3, and thus prevents precise and accurate position identification. For example, even if the input means is moved on the sensor module, the sensor value distribution does not significantly change, making it difficult to detect the movement of the input means. This tendency becomes significant when the input means is large compared with the pitch of the sensor electrodes 230. Although the accuracy of the position identification can be improved by miniaturizing the sensor electrodes 230, a greater burden is placed on the detection circuit 212 because the number of sensor electrodes 230 increases, resulting in an increase in the time required to identify the input position. This causes a reduction in response speed of the sensor module 200, deterioration of the signal-to-noise ratio, and an increase in manufacturing cost and power consumption.

Figure 6A:
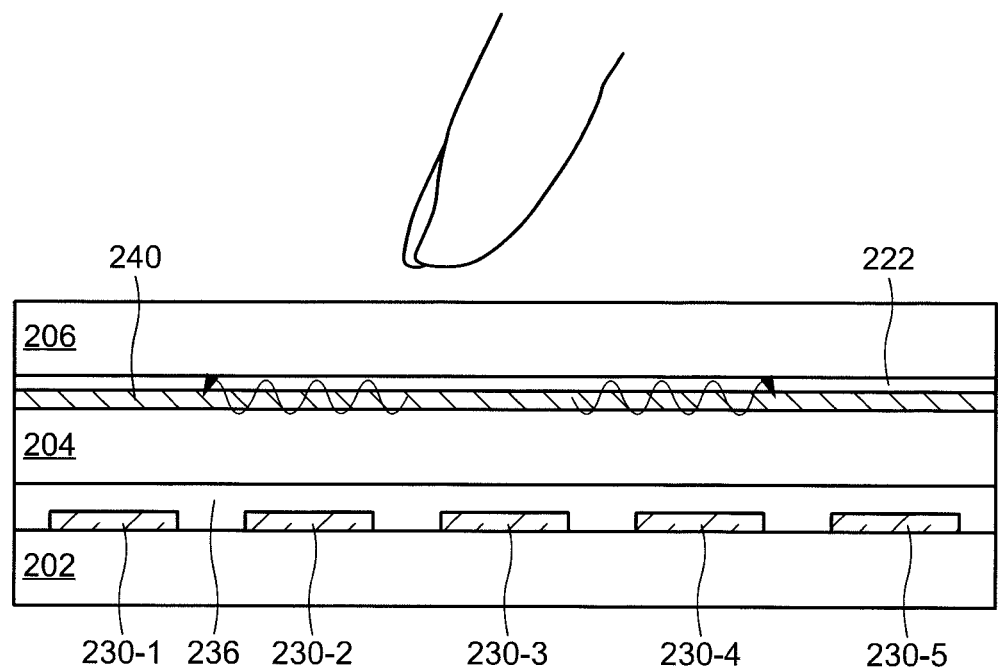
FIG. 6A is a schematic cross-sectional view for explaining an operation of a sensor module according to an embodiment of the present invention.
Figure 6B:
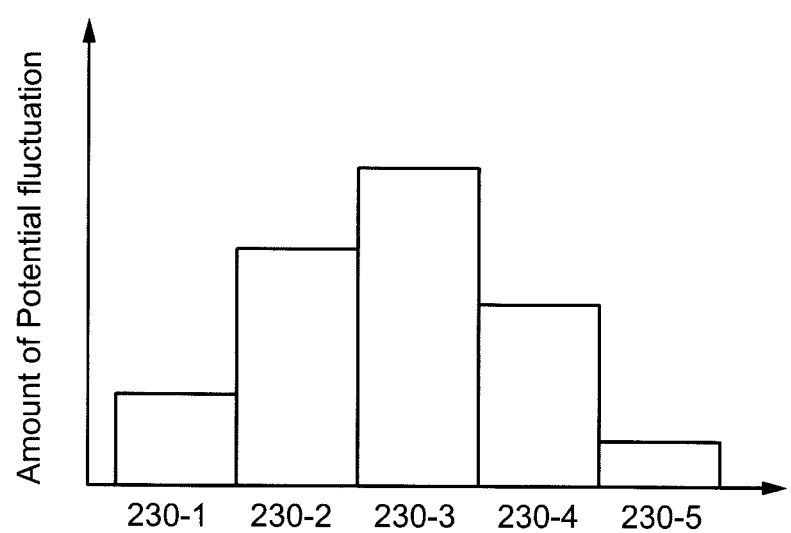
FIG. 6B is a schematic view for explaining an operation of a sensor module according to an embodiment of the present invention.

In contrast, the charge-dispersing film 240 with a relatively high electrical resistance is provided over the sensor electrodes 230 through the capacitance-forming layer 204 in the sensor module 200 according to this embodiment. Therefore, a capacitance is formed by the charge-dispersing film 240, the capacitance-forming layer 204, and the sensor electrodes 230. In such a configuration, the charges, which are generated in the charge-dispersing film 240 when the input means approaches the sensor module 200, flow from above the sensor electrode 230-3 to which the input means becomes closest to above the sensor electrodes 230 in its vicinity (see the wavy arrows in FIG. 6A). As a result, the potentials of the sensor electrodes 230 to which the charges flow through the charge-dispersing film 240 fluctuate due to capacitive coupling and show relatively large sensor values (FIG. 6B). Therefore, since the distribution of the sensor values expands, that is, relatively large sensor values can be obtained from the sensor electrodes 230 located in the vicinity of the sensor electrode 230-3 to which the input means becomes closest, and the position of the input means can be precisely and accurately identified using these sensor values. Therefore, implementation of the present embodiment allows the production of a sensor module capable of precisely identifying the position of the input means without increasing power consumption or decreasing response speed.

Second Embodiment

In this embodiment, a sensor module 250 with a structure different from that of the sensor module 200 described in the First Embodiment is explained. An explanation of the structures the same as or similar to those described in the First Embodiment may be omitted.

Figure 7:
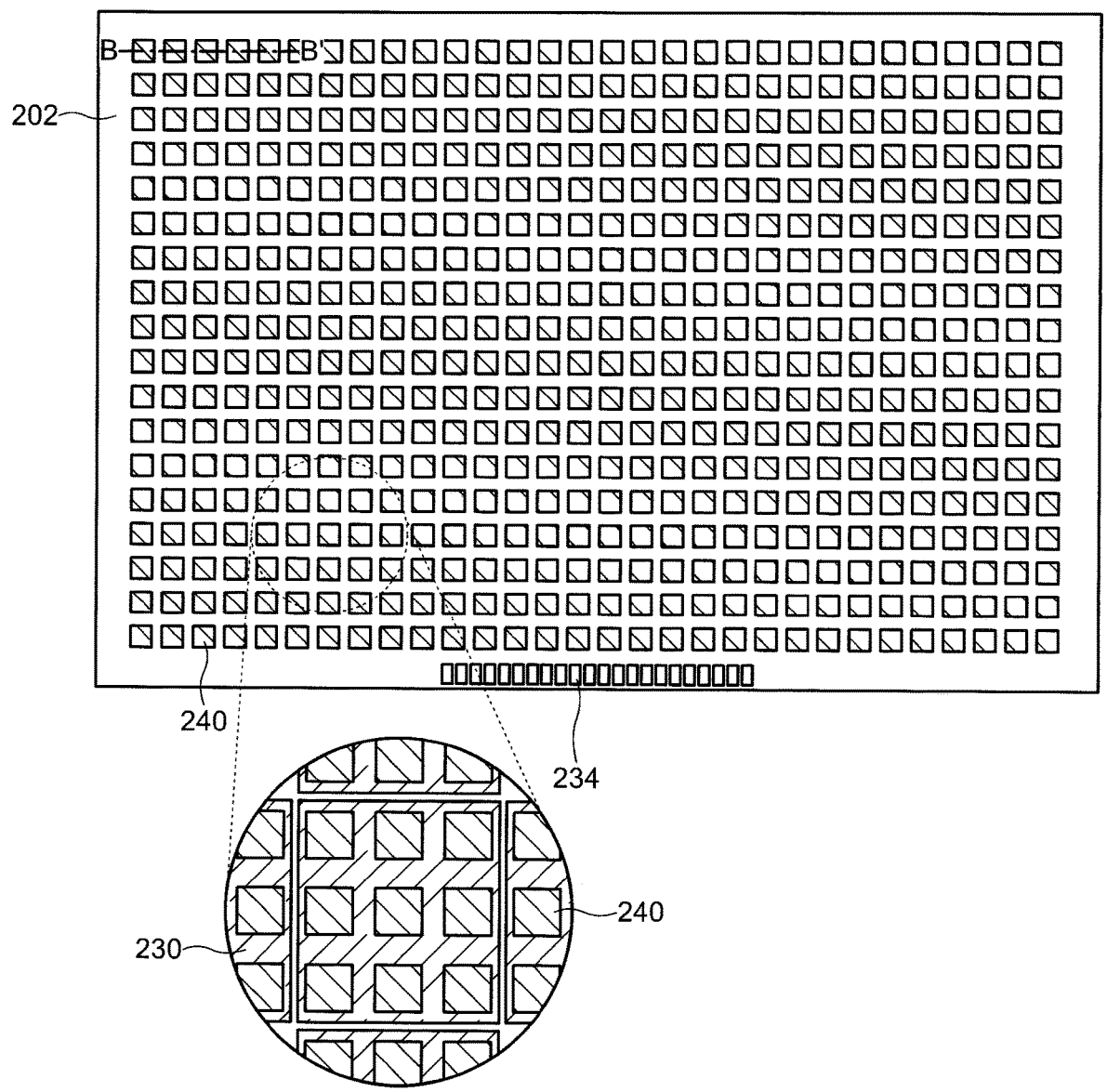
FIG. 7 is a schematic top view of a sensor module according to an embodiment of the present invention.

As shown in a schematic top view of FIG. 7 and a schematic view of the cross section along the chain line B-B' in FIG. 7 (FIG. 8), the sensor module 250 according to this embodiment has a plurality of charge-dispersing films 240 which are electrically isolated from each other and are located in the same layer as each other. The plurality of charge-dispersing films 240 may be electrically floated from each other and may not be electrically connected to any other elements. The size (area) of each charge-dispersing film 240 is smaller than the size of the sensor electrode 230. Therefore, each sensor electrode 230 overlaps two or more charge-dispersing films 240. The plurality of charge-dispersing films 240 may also be arranged in a matrix form with a plurality of rows and columns. In addition, the pitch P of the charge-dispersing films 240 (the distance between the centers or centers of gravity of adjacent charge-dispersing films 240) is preferred to be smaller than the thickness of the capacitance-forming layer 204. Alternatively, although each charge-dispersing film 240 has a rectangular shape in this embodiment, it is preferable that the distance between adjacent sides of the charge-dispersing films 240 be smaller than the thickness of the capacitance-forming layer 204. A capacitance larger than that formed by the charge-dispersing films 240 and the sensor electrodes 230 can be formed in the in-plane direction by setting the pitch P to be smaller than the thickness of the capacitance-forming layer 204. Alternatively, the pitch P of the charge-dispersing films 240 may be determined by the relationship to the size of the corresponding sensor electrode 230. For example, since it is necessary to overlap at least the charge-dispersing films 240 arranged in n rows and m columns over one sensor electrode 230, the pitch of the charge-dispersing films 240 in the x-direction may be set to be 1/n (n is an integer equal to or greater than 3) of the length of the sensor electrode in the x-direction. Similarly, the pitch of the charge-dispersing films 240 in the y-direction may be set to be 1/m (m is an integer equal to or greater than 3) of the length of the sensor electrode in the y-direction.

Similar to the sensor module 200 of the First Embodiment, the plurality of charge-dispersing films 240 provided in the sensor module 250 also include a light-transmitting oxide such as ITO and IZO so as to transmit the light from the display module 110. Alternatively, the charge-dispersing films 240 may include the aforementioned metal or alloy which can be used in the sensor electrodes 230. In this case, the charge-dispersing films 240 are each formed as a mesh with a plurality of openings to ensure the light-transmitting property. The shape, the size, and the aspect ratio of the openings may be determined as appropriate. The plurality of charge-dispersing films 240 of the sensor module 250 may have a relatively low electrical resistance when they are in a floating state in which they are electrically insulated from each other. For example, the electrical resistance of the plurality of charge-dispersing films 240 may be equal to or greater than $1\times10\Omega/\square$ and less than $1\times10^5\Omega/\square$.

The formation of the plurality of charge-dispersing films 240 having the aforementioned configuration and arrangement allows the formation of a capacitance not only between the charge-dispersing films 240 and the sensor electrode 230 but also between adjacent charge-dispersing films 240 in the in-plane direction, thereby generating electrically floating nodes. When the input means approaches, the charge in the charge dispersing film 240 to which the input means becomes closest fluctuates the potentials of the charge dispersing films 240 in the vicinity thereof due to the capacitive coupling. This fluctuation also fluctuates the potentials of the sensor electrodes 230 located in the vicinity of the sensor electrode 230 to which the input means becomes closest, thereby providing relatively high sensor values. Thus, similar to the sensor module 200, the sensor module 250 is also capable of performing precise and accurate position identification.

Figure 9:
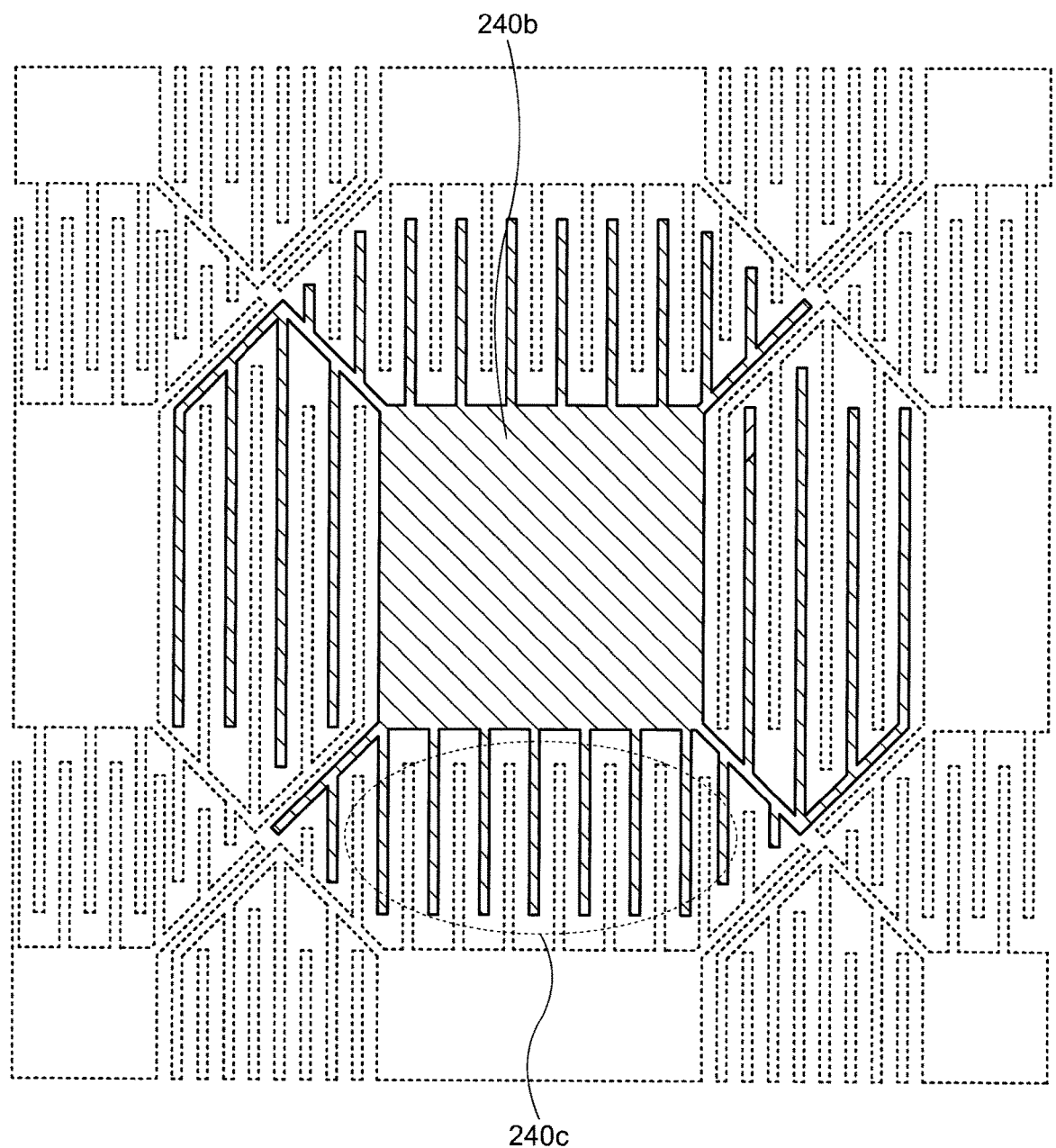
FIG. 9 is a schematic enlarged top view of a sensor module according to an embodiment of the present invention.

In order to form a larger capacitance between adjacent charge-dispersing films 240, a part or the whole of each charge-dispersing film 240 may be processed to have a comb-like structure, and the charge-dispersing films 240 may be configured so that the comb teeth engage between adjacent charge-dispersing films 240. One example is shown in the schematic top view in FIG. 9. Here, one charge-dispersing film 240 is illustrated as a solid line, and a plurality of charge-dispersing films 240 adjacent thereto are shown as dotted lines. In this example, each charge-dispersing film 240 has comb-shaped sections 240c along with a central section 240b. The central section 240b is a portion which does not have a bending structure and may be defined, for example, as a section where the ratio of the maximum length to the maximum width orthogonal thereto (aspect ratio) is equal to or greater than 0.5 and equal to or less than 1.5. On the other hand, the comb-shaped section 240c may be defined as a section having a plurality of bending portions where the aspect ratio between adjacent bending portions deviates from the above range. The comb-shaped sections 240c are formed in both the row direction and the column direction with respect to the central section 240b. As shown in FIG. 9, the charge-dispersing films 240 are configured and arranged so that the comb teeth of adjacent charge-dispersing films 240 engage with each other. In other words, one comb tooth of one charge-dispersing film 240 is arranged to be sandwiched between two adjacent comb teeth of the adjacent charge-dispersing film 240. In the portion where the comb teeth of adjacent charge-dispersing films 240 engage, the distance between adjacent comb teeth is determined between approximately several hundred micrometers and several tens of millimeters in terms of invisibility according to the usage of the display device 100. It is preferable to narrow the distance between adjacent comb teeth to the extent that invisibility can be realized. This structure significantly reduces the in-plane distance between adjacent charge-dispersing films 240 and increases the in-plane length of the formed capacitance, which allows the formation of a larger capacitance between adjacent charge-dispersing films 240. As a result, the sensor values of the sensor electrodes 230 in the vicinity of the sensor electrode 230 to which the input means becomes closest can be increased more effectively.

Figure 10:
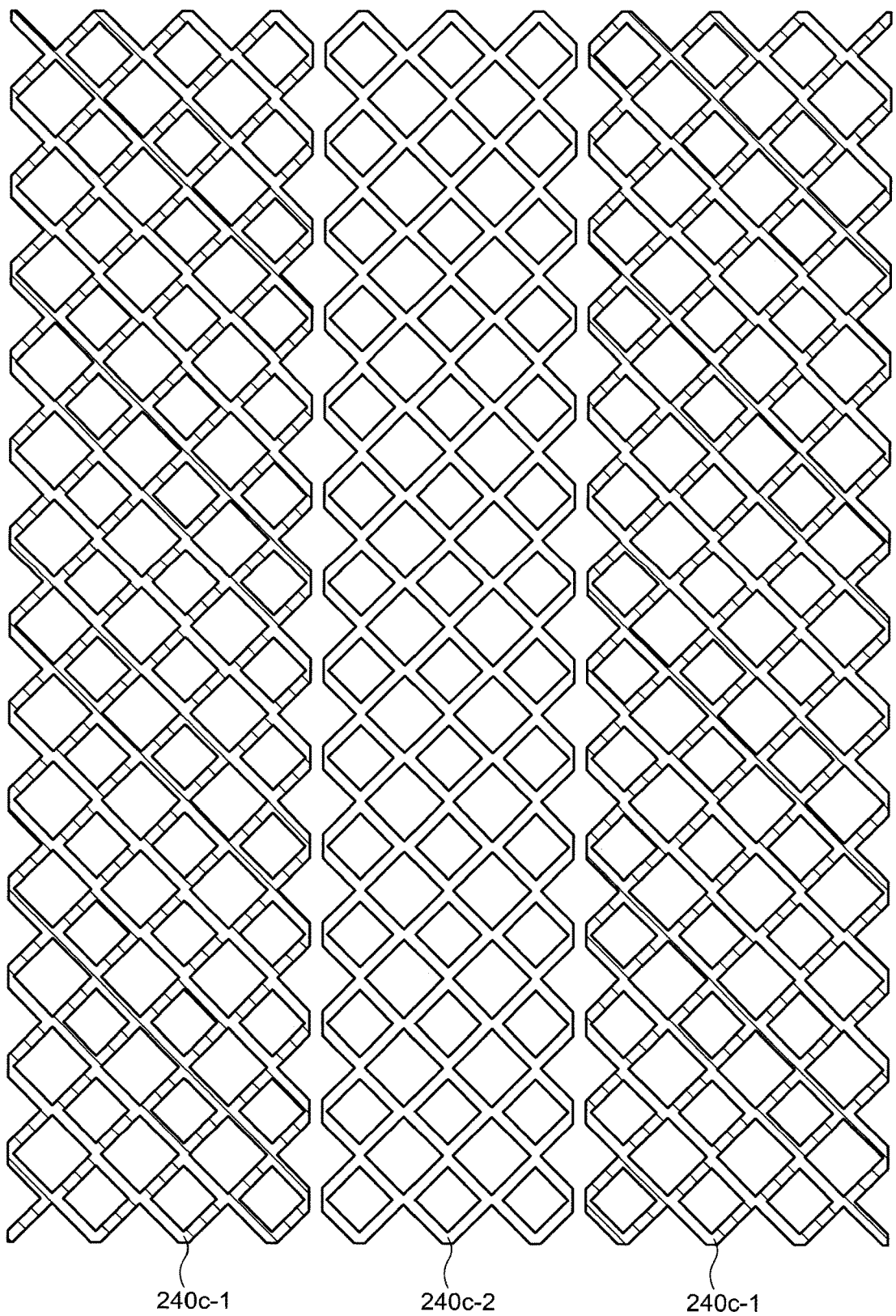
FIG. 10 is a schematic enlarged top view of a sensor module according to an embodiment of the present invention.

As described above, the charge-dispersing films 240 of this embodiment may have a mesh shape including a metal. In this case, not only the central section 240b but also the comb-shaped portion 240c may have a mesh shape as shown in FIG. 10. The aspect ratio of the opening of the mesh may be arbitrarily determined. For example, the distance between adjacent comb teeth may be reduced to increase the capacitance therebetween by decreasing the ratio of the length of the opening in the extending direction of the comb teeth to the length in the direction perpendicular thereto.

No wirings or electrodes may be placed between adjacent comb teeth 240c-1, and the adhesive layer 222 and the capacitance-forming layer 204 may be in contact with each other between the adjacent comb teeth 240c-1. However, as shown in FIG. 10, an electrically floating dummy wiring 240c-2 having a mesh structure similar to the comb teeth 240c-1 may be provided between adjacent comb teeth 240c-1. Although the dummy wiring 240c-2 may exist in the same layer as the central section 240b and the comb section 240c and may have a similar shape thereto, it is not connected to the central section 240b and the comb section 240c and is electrically floating. Uniform optical characteristics can be obtained over the entire sensor region where the plurality of charge-dispersing films 240 are provided by arranging the dummy wiring 240c-2, thereby preventing the generation of moiré.

Figure 11:
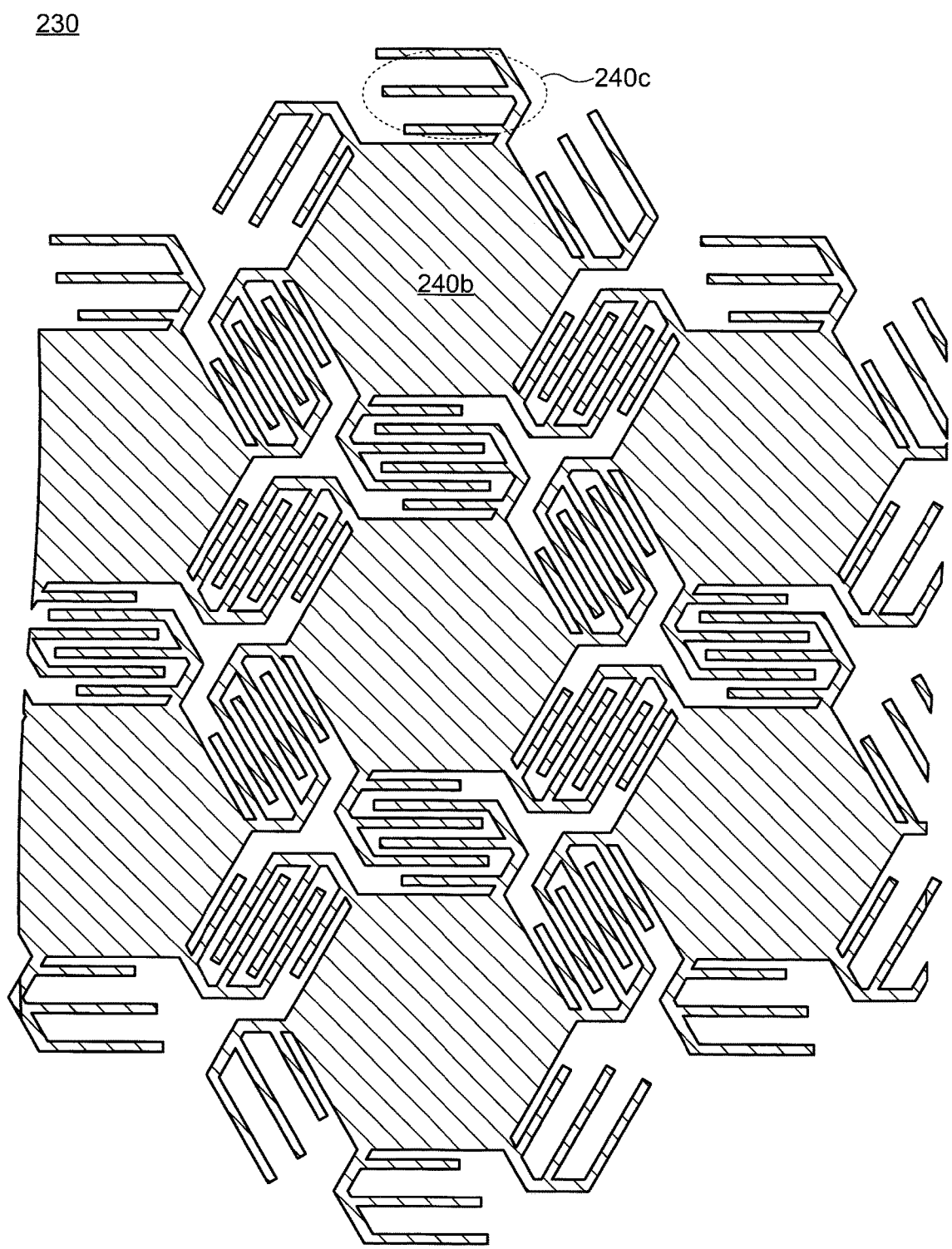
FIG. 11 is a schematic enlarged top view of a sensor module according to an embodiment of the present invention.

Note that the shape of the central section 240b is not limited to a square, and the central section 240b may have any shape. For example, as shown in FIG. 11, the central section 240b may be a regular hexagon or close to a hexagon. In this case, six comb-shaped sections 240c are formed to surround the central section 240b. Although not illustrated, the shape of the central section 240b may be octagonal, for example. As the number of polygonal corners formed by the central section 240b increases, the number of charge-dispersing films 240 adjacent to one charge-dispersing film 240 increases, thereby enabling more accurate position identification.

Figure 12:
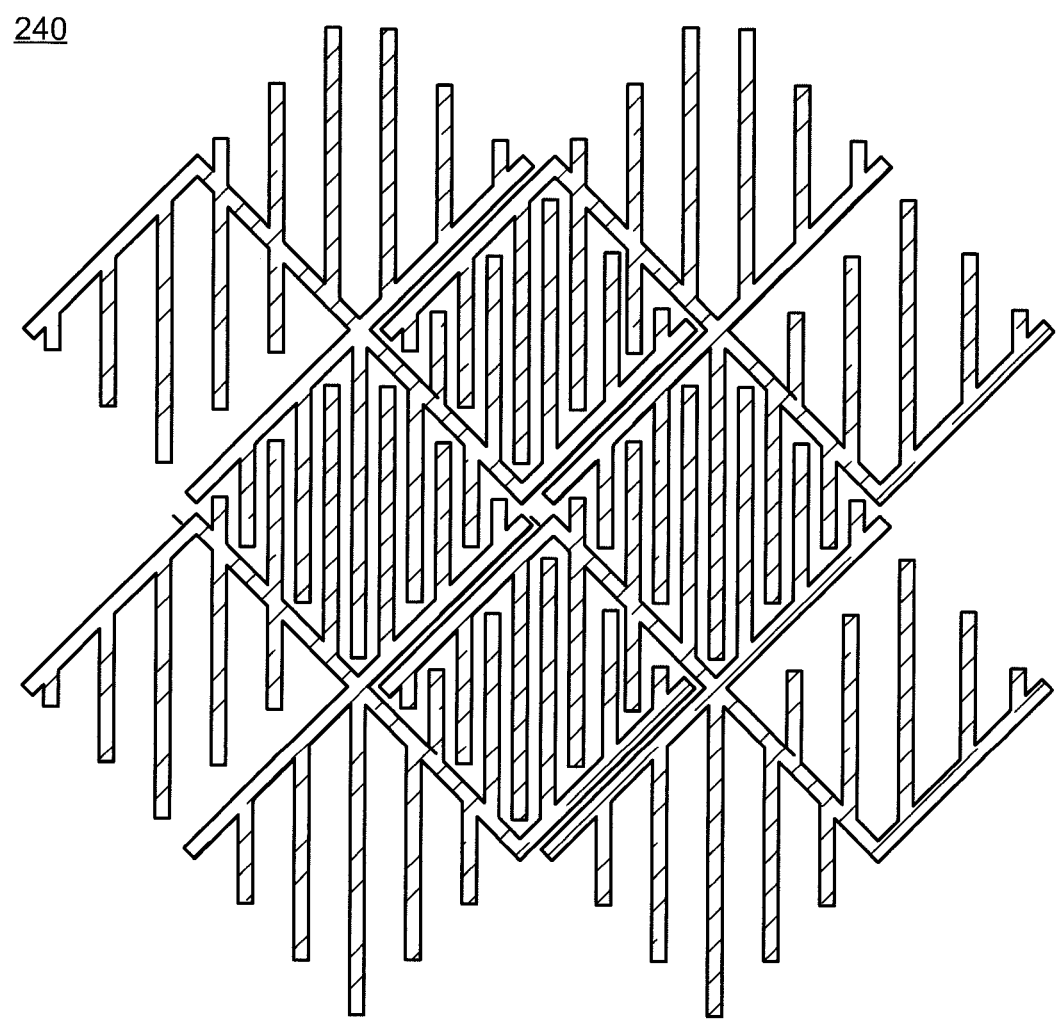
FIG. 12 is a schematic enlarged top view of a sensor module according to an embodiment of the present invention.

Furthermore, as shown in FIG. 12, each charge-dispersing film 240 may not have a central section 240b and may consist of comb-shaped sections 240c. In such a configuration, the size of the comb-shaped sections 240c in each charge-dispersing film 240 is maximized, which allows the formation of an extremely large capacitance between adjacent charge-dispersing films 240.

Figure 8:
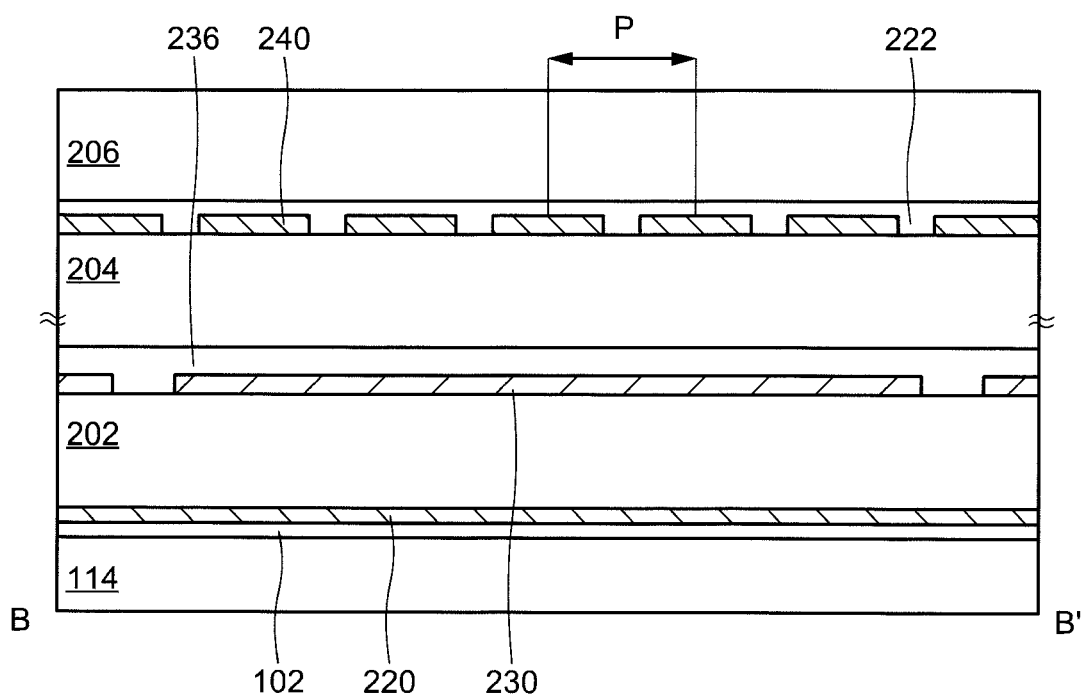
FIG. 8 is a schematic cross-sectional view of a sensor module according to an embodiment of the present invention.
Figure 13:
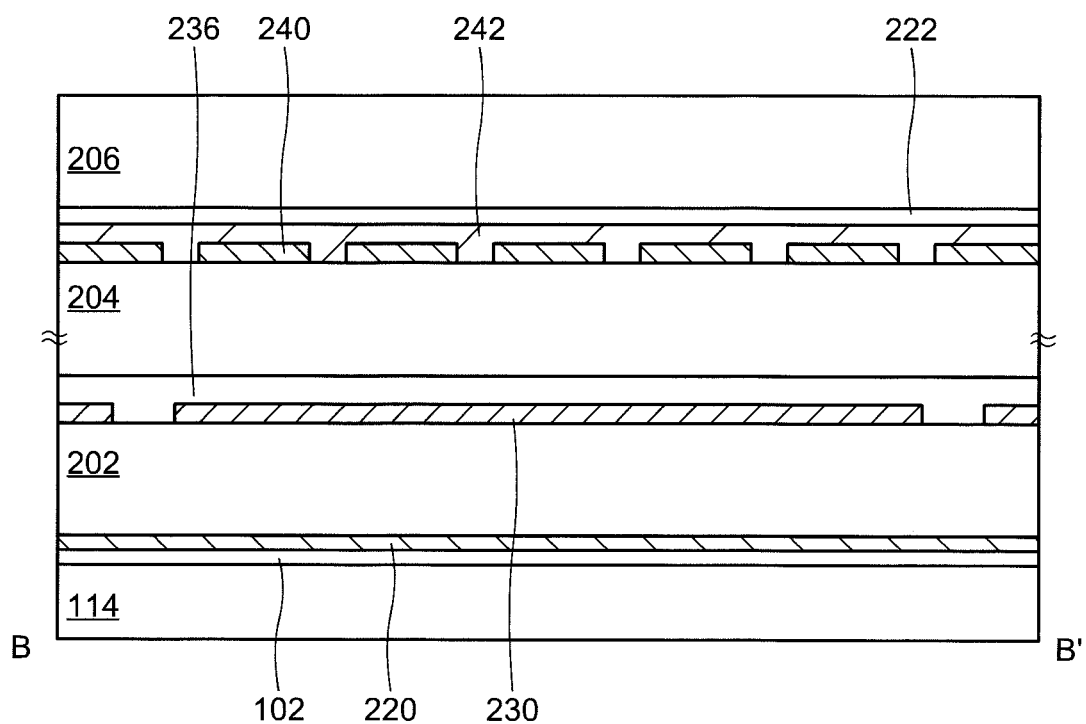
FIG. 13 is a schematic cross-sectional view of a sensor module according to an embodiment of the present invention.

Note that, as shown in FIG. 13 which is a schematic cross-sectional view corresponding to FIG. 8, the sensor module 250 may have an antistatic film 242 over or under the plurality of charge-dispersing films 240. The antistatic film 242 has a higher electrical resistance than the charge-dispersing film 240 and is electrically connected to the plurality of charge-dispersing films 240. For example, the electrical resistance of the antistatic film 242 may be equal to or greater than $1\times10^7$ $\Omega/\square$ and less than $1\times10^9$ $\Omega/\square$. The antistatic film 242 is also configured to transmit visible light, may include a conductive oxide such as ITO and IZO, for example, and may further include silicon. The antistatic film 242 is connected to a constant potential (e.g., ground potential) through the first connector 210. The antistatic film 242 prevents the sensor module 250 from being electrically charged, thereby preventing the entry of static electricity or the like from the outside.

Third Embodiment

In this embodiment, a sensor module 260 having a structure different from the sensor modules 200 and 250 described in the First and Second Embodiments as well as the display device 100 including the sensor module 260 are explained. An explanation of the structures the same as or similar to those described in the First or Second Embodiment may be omitted.

Figure 14:
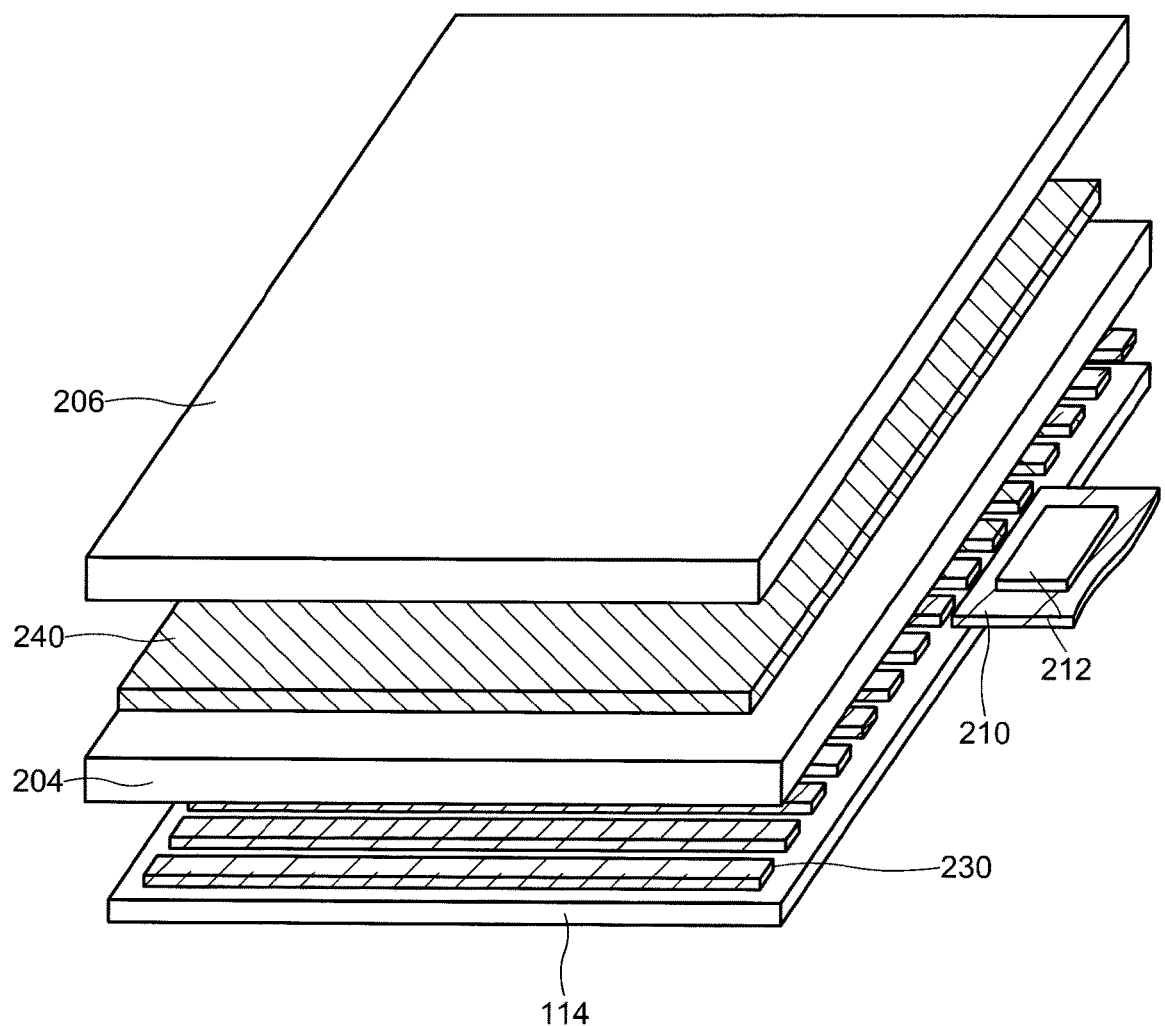
FIG. 14 is a schematic developed perspective view of a sensor module according to an embodiment of the present invention.

The sensor module 260 according to the present embodiment is a module which can be applied to a display device with a so-called in-cell type mutual capacitive touch sensor. The sensor module 260 includes, as the fundamental components, the plurality of sensor electrodes 230 arranged over the counter substrate 114 of the display device 100, the capacitance-forming layer 204 over the plurality of sensor electrodes 230, and the charge-dispersing film 240 over the capacitance-forming layer 204 as shown in a schematic developed perspective view of FIG. 14. The cover substrate 206 is disposed over the charge-dispersing film 240.

Figure 15:
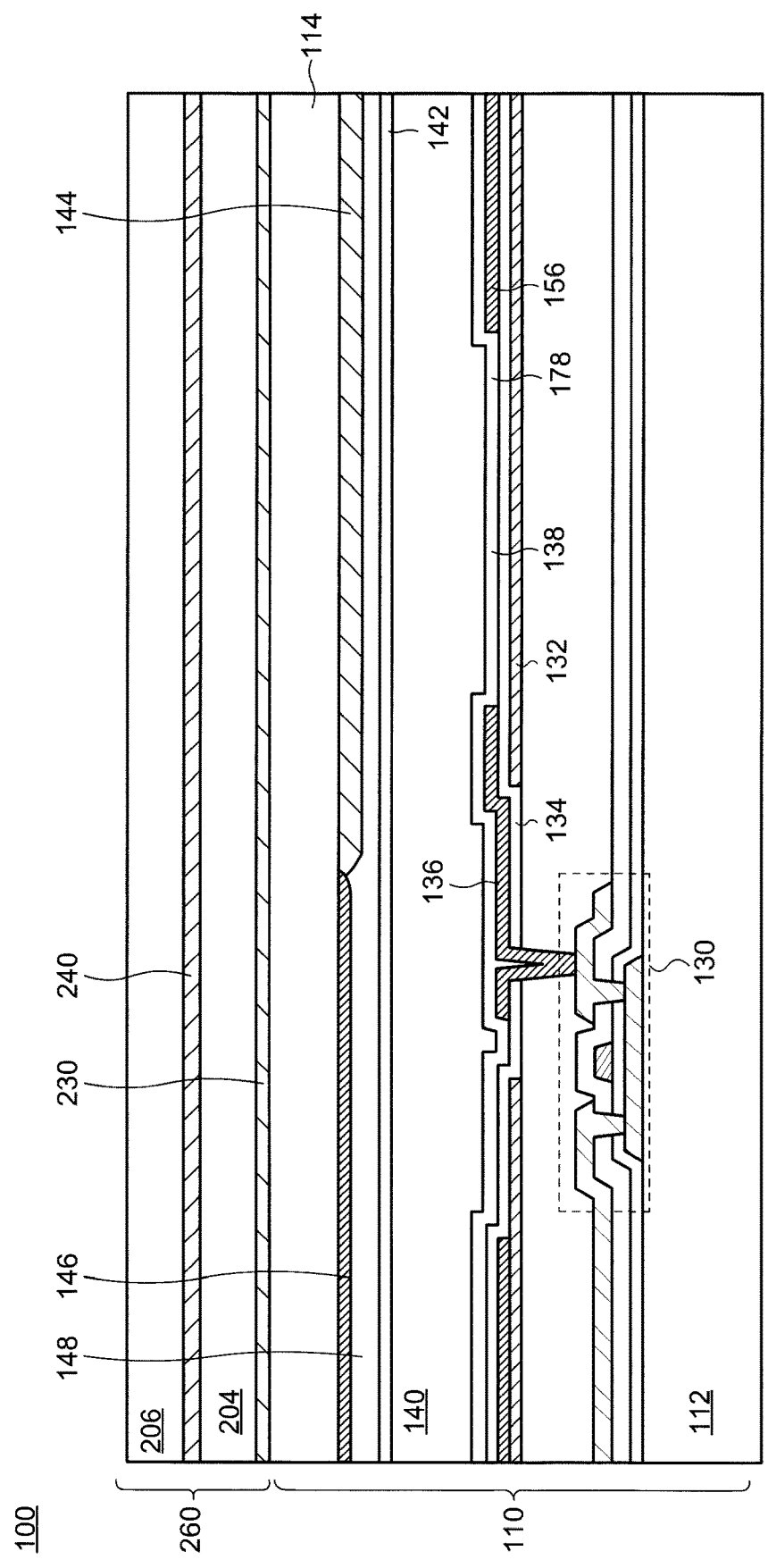
FIG. 15 is a schematic cross-sectional view of a display device according to an embodiment of the present invention.

FIG. 15 shows a schematic cross-sectional view of the display device 100 centered on one pixel 116. There are no restrictions on the configuration of the display module 110 included in the display device 100, and any known structure may be applied as appropriate. In the display module 110 shown in FIG. 15, a plurality of pixel circuits each including a variety of elements such as a transistor 130 is provided over the array substrate 112, over which a liquid crystal element connected to the pixel circuit is formed. The liquid crystal element includes a pixel electrode 136 electrically connected to the pixel circuit, a common electrode 132, an interlayer insulating film 134 insulating the pixel electrode 136 and the common electrode 132, a first orientation film 138 and a second orientation film 142 over the pixel electrode 136 and the common electrode 132, and a liquid crystal layer 140 arranged between the first orientation film 138 and the second orientation film 142. The counter substrate 114 is disposed over the liquid crystal element, and a light-shielding film 146, a color filter 144, and the like covered by an overcoat 148 are arranged over the counter substrate 114 (below the counter substrate 114 in FIG. 15).

The plurality of sensor electrodes 230 of the sensor module 260 is arranged in a stripe shape, over which the charge-dispersing film 240 is disposed through the capacitance-forming layer 204. Although not illustrated, polarizing films are respectively provided under the array substrate 112 and over the cover substrate 206 in the display device 100. Adhesive layers which are not illustrated may be provided between the sensor electrodes 230 and the counter substrate 114, between the sensor electrodes 230 and the capacitance-forming layer 204, and between the capacitance-forming layer 204 and the cover substrate 206. Alternatively, the sensor electrodes 230 and the counter substrate 114 may be in contact with each other, the sensor electrodes 230 and the capacitance-forming layer 204 may also be in contact with each other, or the capacitance-forming layer 204 and the cover substrate 206 may also be in contact with each other.

Here, a plurality of common electrodes 132 is provided in a stripe shape in the display module 110, and each common electrode 132 overlaps the pixels 116 arranged in a plurality of rows or a plurality of columns and also intersects the plurality of sensor electrodes 230. Furthermore, the common electrodes 132 function as one electrode for controlling the orientation of the liquid crystal layer 140 of the liquid crystal element and simultaneously function as an electrode for detecting the input means in the sensor module 260. Specifically, during the period for displaying an image by the display module 110, the common electrodes 132 are supplied with a predetermined potential so that the orientation of the liquid crystal layer 140 is controlled in cooperation with the pixel electrode 136. On the other hand, during the period of detecting the input means, a pulse voltage of a constant frequency (e.g., from several kHz to several tens of kHz) is applied to the common electrodes 132, and the common electrodes 132 function as a configuration of the sensor module 200 in cooperation with the sensor electrodes 230.

The sensor electrodes 230 are connected to the detection circuit 212 provided over the first connector 210, and fluctuations in their potentials are detected by the detection circuit 212. As described above, since an alternating voltage is supplied to the common electrodes 132 in a time-division manner, a capacitance is formed between the common electrode 132 and the sensor electrode 230. When the input means approaches, this capacitance changes, and the detection circuit 212 detects this change through the sensor electrode 230, by which the coordinates representing the input position is determined.

As the charge-dispersing film 240 included in the sensor module 260, the plurality of charge-dispersing films 240 described in the First or Second Embodiment may be applied. Although not illustrated, when the plurality of charge-dispersing films 240 is applied, the antistatic film 242 may be additionally provided as described in the Second Embodiment. As described above, since the sensor module 260 is provided with the charge-dispersing films 240, a sensor module capable of highly precise identification of the position of the input means can be produced without increasing power consumption and decreasing response speed.

Note that the configuration in which the sensor electrodes 230 are provided over the counter substrate 114 may also be employed in the present embodiment. In this case, the capacitance-forming layer 204, the charge-dispersing film 240, and the cover substrate 206 may be provided over the sensor electrodes 230. In this case, the configuration in which these sensor electrodes 230, capacitance-forming layer 204, and charge-dispersing film 240 are provided over the display module 110 may be referred to as a sensor module or a display device having a touch panel function.

Fourth Embodiment

In this embodiment, a sensor module 270 having a structure different from the sensor modules 200, 250, and 260 described in the First to Third Embodiments as well as the display device 104 including the sensor module 270 are explained. An explanation of the structures the same as or similar to those described in the First to Third Embodiments may be omitted.

Figure 16:
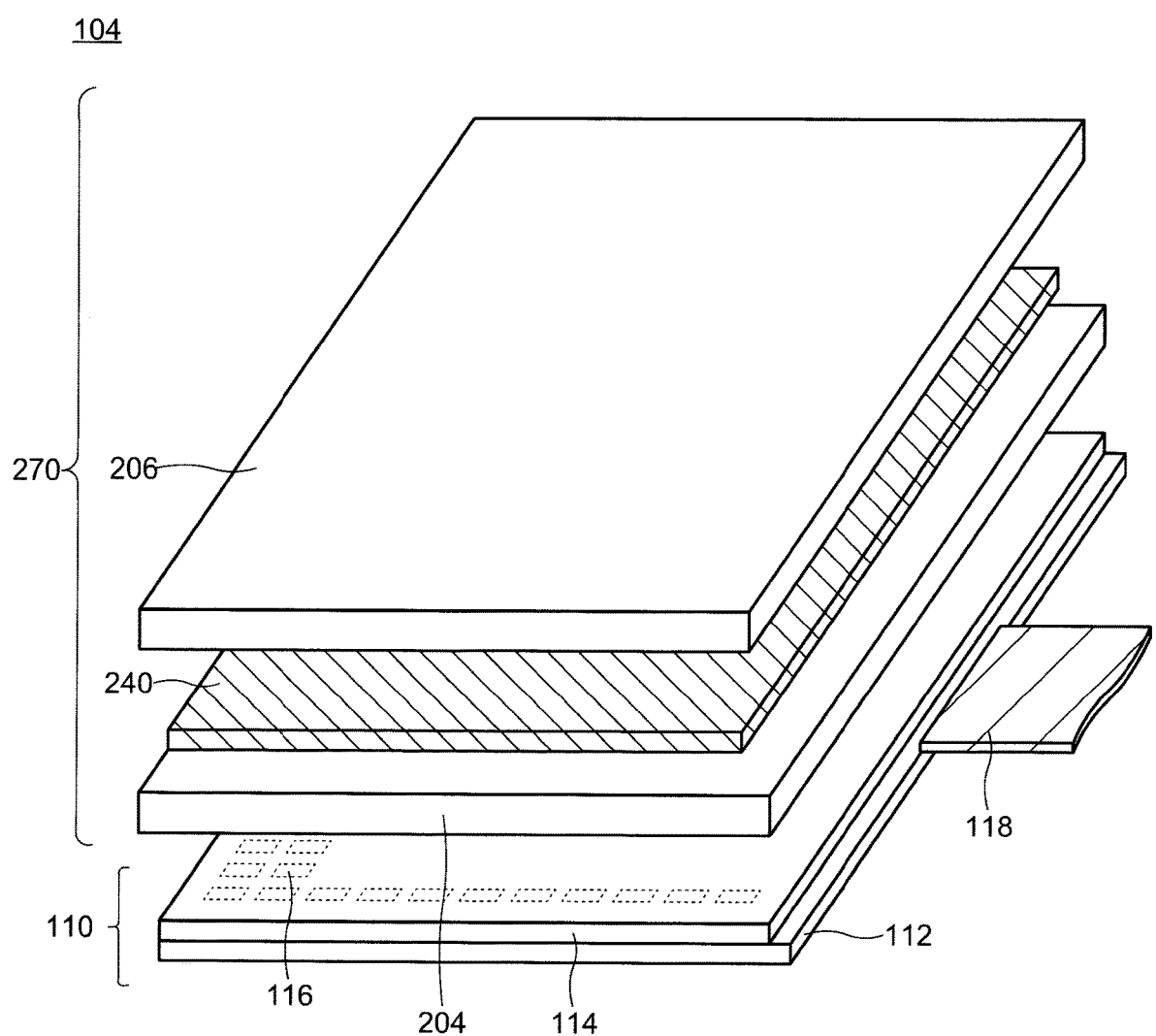
FIG. 16 is a schematic perspective view of a display device according to an embodiment of the present invention.

The sensor module 270 according to the present embodiment is a module capable of being applied to a display device with a so-called in-cell type self-capacitive touch sensor. However, as shown in the schematic developed perspective view of FIG. 16, the sensor module 270 differs from the sensor module 260 in that it does not have the sensor electrode 230. Therefore, the sensor module 270 includes, as its fundamental components, the capacitance-forming layer 204 arranged over the display module 110 and the charge-dispersing film 240 over the capacitance-forming layer 204. The cover substrate 206 is provided over the charge-dispersing film 240.

Figure 17:
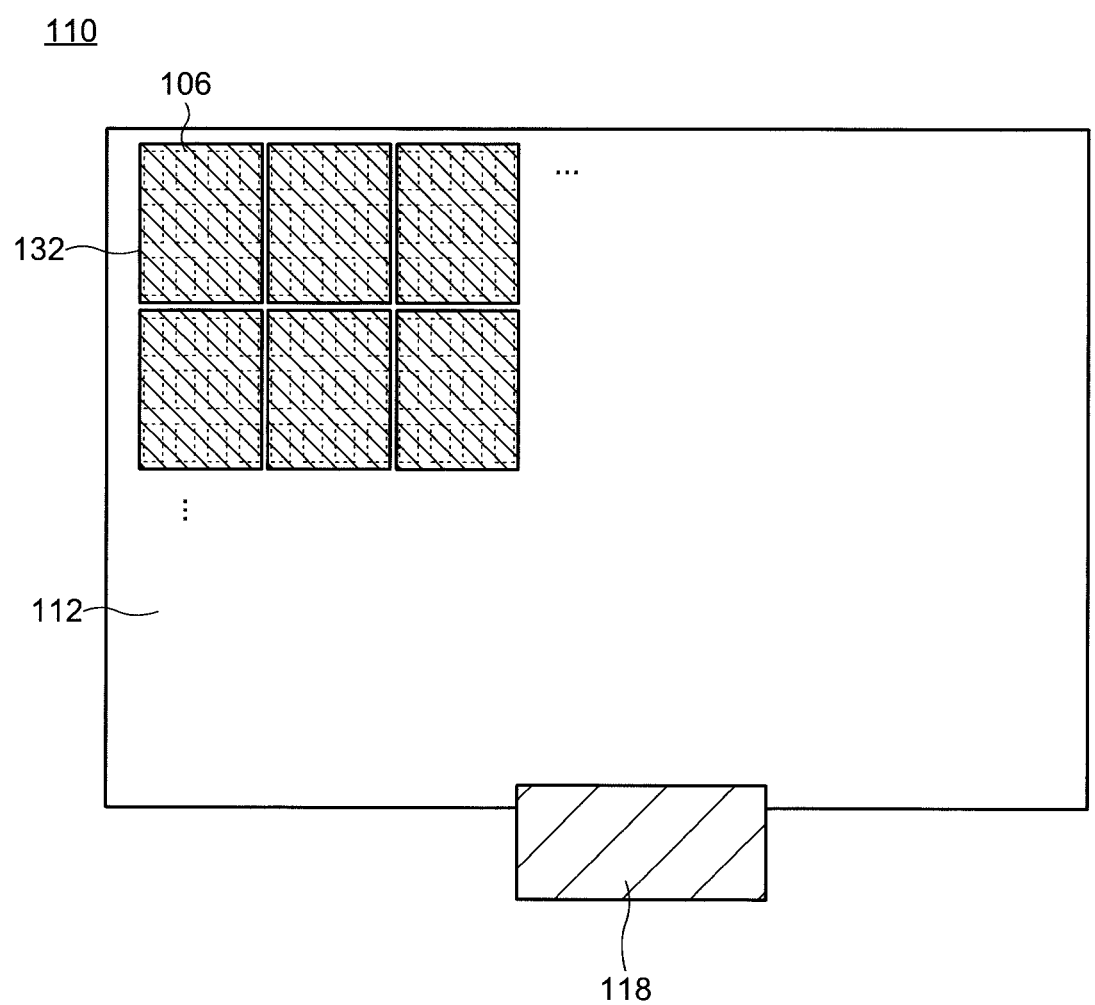
FIG. 17 is a schematic top view of a display module of a display device according to an embodiment of the present invention.
Figure 18:
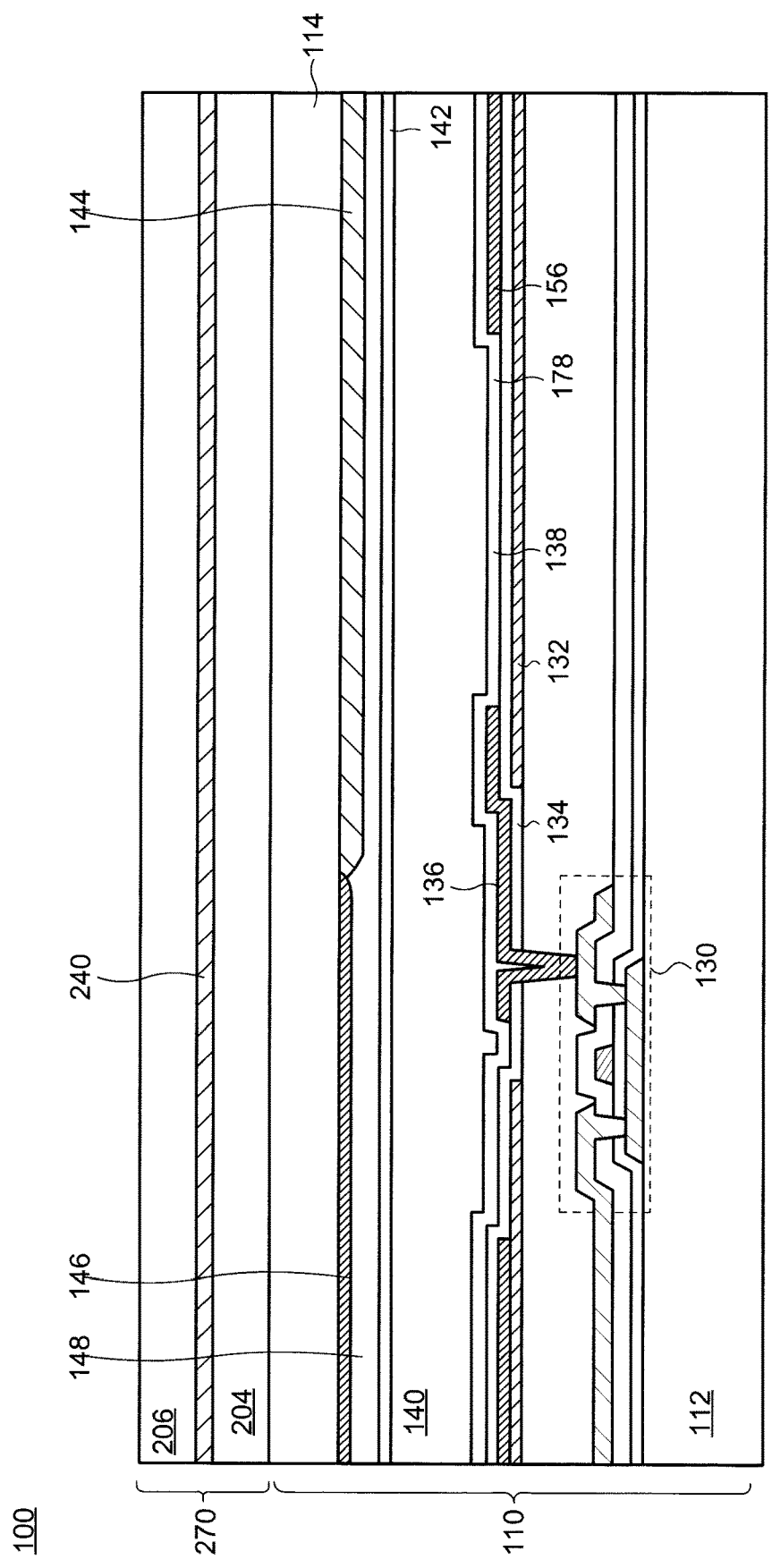
FIG. 18 is a schematic cross-sectional view of a display device according to an embodiment of the present invention.

The function of the sensor electrodes 230 is performed by the common electrodes 132 arranged in the display module 110. Specifically, as shown in a schematic top view of FIG. 17 and a schematic cross-sectional view corresponding to FIG. 15 (FIG. 18), the plurality of common electrodes 132 are arranged in a matrix form so that each overlaps a corresponding plurality of pixel electrodes 136 in the display module 110 according to this embodiment. Similar to the display module 110 described in the Third Embodiment, during the period for displaying images, the common electrodes 132 are supplied with a predetermined potential from an external circuit (not illustrated) through the connector 118 so that the orientation of the liquid crystal layer 140 is controlled in cooperation with the pixel electrodes 136. As a result, the orientation of the liquid crystal layer 140 is controlled in each pixel 116, and gradation according to the video signal is realized.

During the period for detecting the input means, a pulse voltage of a constant frequency (e.g., from several kHz to several tens of kHz) is supplied to each common electrode 132, and a capacitance is formed on the basis of the pulse voltage which changes when the input means approaches. It is possible to detect the input means and identify its coordinates by detecting the change in pulse voltage based on the change in capacitance.

Similar to the sensor module 260, the plurality of charge-dispersing films 240 described in the First or Second Embodiment may be applied as the charge-dispersing film 240 included in the sensor module 270. In addition, when the plurality of charge-dispersing films 240 is applied, the antistatic film 242 may be additionally provided as described in the Second Embodiment. A sensor module capable of highly precise identification of the position of the input means can be produced by providing the charge-dispersing film 240 without increasing power consumption and decreasing response speed.

Note that the capacitance-forming layer 204, the charge-dispersing film 240, and the cover substrate 206 may be provided over the counter substrate 114 in this embodiment. Furthermore, the counter substrate 114 may be regarded as the capacitance-forming layer 204, and the charge-dispersing film 240 and the cover substrate 206 may be provided over the counter substrate 114. In this case, the configuration in which these sensor electrodes 230, capacitance-forming layer 204, and charge-dispersing film 240 are disposed over the display module 110 may be referred to as a sensor module or a display device with a touch panel function.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. A sensor module comprising:
   a first substrate having an insulating property;
   a plurality of sensor electrodes over the first substrate;
   a second substrate having an insulating property over the plurality of sensor electrodes;
   a plurality of conductive films transmitting visible light over the second substrate;
   an antistatic film located over or under the plurality of conductive films and electrically connected to the plurality of conductive films; and
   a third substrate over the plurality of conductive films and the antistatic film,
   wherein the antistatic film has a larger electrical resistance than the plurality of conductive films.

2. The sensor module according to claim 1,
   wherein each of the plurality of conductive films has an electrical resistance equal to or greater than $1\times10^5\Omega/\square$ and less than $1\times10^7\Omega/\square$.

3. The sensor module according to claim 1,
   wherein each of the plurality of conductive films has a comb-shaped structure, and
   the plurality of conductive films is arranged so that one comb tooth of a first conductive film selected from the plurality of conductive films is sandwiched by two comb teeth of a second conductive film selected from the plurality of conductive films and adjacent to the first conductive film.

4. The sensor module according to claim 3,
   wherein each of the plurality of conductive films has the comb-shaped structure as a whole.

5. The sensor module according to claim 1,
   wherein each of the plurality of conductive films includes a light-transmitting oxide containing indium.

6. The sensor module according to claim 1,
   wherein each of the plurality of conductive films includes a metal and has a plurality of openings.

7. The sensor module according to claim 1,
   wherein the antistatic film is configured to be supplied with a constant potential.

8. A display device comprising:
   a display module; and
   a sensor module over the display module,
   wherein the sensor module comprises:
     a first substrate having an insulating property;
     a plurality of sensor electrodes over the first substrate;
     a second substrate having an insulating property over the plurality of sensor electrodes;
     a plurality of conductive films transmitting visible light over the second substrate;
     an antistatic film located over or under the plurality of conductive films and electrically connected to the conductive films; and
     a third substrate over the plurality of conductive films and the antistatic film, and
   the antistatic film has a larger electrical resistance than the plurality of conductive films.

9. The display device according to claim 8,
   wherein each of the plurality of conductive films has an electrical resistance equal to or greater than $1\times10^5\Omega/\square$ and or less than $1\times10^7\Omega/\square$.

10. The display device according to claim 8,
    wherein each of the plurality of conductive films has a comb-shaped structure, and
    the plurality of conductive films is arranged so that one comb tooth of a first conductive film selected from the plurality of conductive films is sandwiched by two comb teeth of a second conductive film selected from the plurality of conductive films and adjacent to the first conductive film.

11. The display device according to claim 10,
    wherein each of the plurality of conductive films has the comb-shaped structure as a whole.

12. The display device according to claim 8,
    wherein each of the plurality of conductive films includes a light-transmitting oxide containing indium.

13. The display device according to claim 8,
    wherein each of the plurality of conductive films includes a metal and has a plurality of openings.

14. The display device according to claim 8,
wherein the antistatic film is configured to be supplied with a constant potential.

\* \* \* \* \*